United States Patent [19]

Farrell et al.

[11] Patent Number: 5,536,232

[45] Date of Patent: Jul. 16, 1996

[54] ANTI-G SUIT WITH PRESSURE REGULATOR

[75] Inventors: Philip S. E. Farrell, North York; Andrew A. Goldenberg, Toronto; Daniel Meidan, North York, all of Canada

[73] Assignee: Her Majesty the Queen in right of Canada, as represented by the Minister of Defence, Ottawa, Canada

[21] Appl. No.: 320,412

[22] Filed: Oct. 3, 1994

[30] Foreign Application Priority Data

Oct. 5, 1993 [CA] Canada ................................ 2107692

[51] Int. Cl.6 .................................................. B64D 25/02
[52] U.S. Cl. ........................................ 600/19; 128/202.11
[58] Field of Search .................. 600/19, 20; 128/202.11; 137/625.24

[56] References Cited

U.S. PATENT DOCUMENTS

| | | | |
|---|---|---|---|
| 2,319,347 | 5/1943 | Reed | 137/625.24 |
| 2,593,733 | 4/1952 | Davis | 251/105 |
| 3,454,049 | 4/1967 | Hoos | 137/625.65 |
| 3,780,723 | 12/1973 | Van Patten | 128/1 A |
| 3,956,772 | 5/1976 | Cox | 600/19 |
| 3,994,314 | 11/1976 | Hartley | 137/596.17 |
| 4,057,046 | 11/1977 | Kawaguchi | 128/24 R |
| 4,086,920 | 5/1978 | Miniere | 128/24 R |
| 4,219,039 | 8/1980 | Jaggars | 137/38 |
| 4,408,599 | 10/1983 | Mummert | 128/24 R |
| 4,512,546 | 4/1985 | Inada et al. | 251/65 |
| 4,548,383 | 10/1985 | Wolfges | 251/129 |
| 4,637,074 | 1/1987 | Teheri | 2/2 |
| 4,638,791 | 1/1987 | Krogh et al. | 600/19 |
| 4,736,731 | 4/1988 | Van Patten | 128/1 A |
| 4,838,954 | 6/1989 | Perach | 137/625.65 |
| 4,895,320 | 1/1990 | Armstrong | 244/118.5 |
| 5,007,893 | 4/1991 | Row | 600/20 |
| 5,083,745 | 1/1992 | Tischer | 251/129.11 |
| 5,226,410 | 7/1993 | Fournol | 600/20 |

FOREIGN PATENT DOCUMENTS

| | | | |
|---|---|---|---|
| 2455765 | 5/1979 | France | G05D 7/00 |
| 2051311 | 5/1980 | United Kingdom | F16K 31/04 |

OTHER PUBLICATIONS

Farrell Design of A Microprocessor Controlled Anti-G Valve for a Fighter Aircraft Pilot's G Protection System Mar. 1985.
Farrell Design of A New Anti-G Protection System for Advanced Tactical Fighter Aircraft Pilots Jul. 1987.
Farrell et al Overhaul Instruction 1 Sep. 1973.
Burton et al Devolpment, Test, etc 1979.
Positive Pressure Breathing 1978.
Crosbie et al Servi Operated Anti-G Suit 22 May 1984.
Van Patten Development of an Electro-Pneumatic etc.

*Primary Examiner*—Angela D. Sykes
*Assistant Examiner*—Eric Winakur
*Attorney, Agent, or Firm*—Anthony Asquith & co.

[57] ABSTRACT

Inflating a fighter-pilot's anti-G suit to the correct pressure is facilitated by the pressure regulator design. Using Preview Control, the movement of the control stick is used to predict what the G-force on the aircraft will be in the time ahead. A computer determines what pressure is needed in the suit to safeguard the pilot at that G-force. The size of the air-flow aperture in the regulator is defined by overlapping windows in the housing and rotor of the regulator. The rotor is moved to give the correct overlap by means of a servo motor or stepper motor, which positions the rotor in response to the computer output. The very fast, stable, response of the regulator to the computer input enables the suit pressure to follow the G-forces predicted by Preview Control with great accuracy.

20 Claims, 6 Drawing Sheets

ANTI-G SUIT WITH PRESSURE REGULATOR

BACKGROUND OF THE INVENTION

This invention relates to anti-G suits, of the kind used by pilots in high performance aircraft. A modern fighter aircraft is capable, as a structure, of withstanding the forces associated with carrying out manoeuvres up to about 15-G. However, even with the best of conventional precautions to protect the pilot, the pilot undergoes such physiological problems as blacking out at about 10-G. Under normal conditions, the pilot starts to suffer G-force-related problems at 6- or 7-G.

It is conventional practice to equip a fighter pilot with an anti-G suit, in which inflatable bladders are secured around the pilot's legs. A sensor senses the G-force on the aircraft, and inflates the bladders to an appropriate pressure. The pressurised bladders serve to prevent blood pooling in the pilot's feet, whereby the blood is prevented from draining from the brain, and causing blackout and the other physiological problems. Conventional anti-G suits add about 1-G to the pilot's tolerance of G-forces.

The designer of the anti-G suit is faced with the following considerations. A first problem is that, if the suit is inflated/deflated too slowly, the suit might actually harm the pilot, by trapping blood in the lower extremities.

A second problem is that the suit should not, for physiological reasons, be pre-inflated to a pressure higher than that dictated by the G-force, for more than a few moments, since that might seriously affect the pilot's blood pressure, and hence his capability/comfort level.

A third consideration is that it takes about half a second to one second, after the pilot has actuated the control stick to call for a change in G-force, for the G-force actually to come onto the aircraft. It takes the conventional anti-G suit and pressure regulation device about another half-second to a second to inflate the suit to the correct pressure as dictated by the new G-force on the aircraft. This speed of response is only acceptable if the aircraft changes G-force slowly, and if a second change in G-force is not commenced until the first change has been completed, and the suit inflated. Of course, in a fighter aircraft, the pilot may be changing his demands of the aircraft several times a second.

It may be noted that there are two components to the time it takes to effect a change in the pressure in the suit. First, the pressure regulator has to be re-set so as to admit a flow of air into, or out of, the suit; in particular, in the regulator, the size of the aperture or orifice through which air flows into or out of the suit has to be changed, and this change takes a measurable time. Secondly, there is the component of time that it takes the air actually to flow into or out of the suit. It is these two components in aggregate which take the second or half-second, as referred to.

With the conventional manner of controlling the inflation of the anti-G suit, it was not really worth reducing the suit-inflation time. If the suit inflation time were, at great expense, reduced below half a second, say, it would make little difference. For occasional changes of G-force (ie changes spaced more than about 2 seconds apart) the conventional pressure-control system could keep up. For more rapid changes in G-force, the suit pressure could not begin to change until after the G-force was established, which swamped any such minor gain in the suit-inflation-time.

It is known, however, that it is possible to predict the G-force that will be present in the aircraft in about one second's time. That is to say: although it takes about a second after the pilot actuates the control stick for the G-force to actually come onto the aircraft, it is possible to compute, more or less immediately after he has actuated the control stick, what that G-force will be. Therefore, it is possible, at least theoretically, to set the pressure in the suit according to that predicted G-force, rather than to the actual G-force already established on the aircraft. If this is done, the second or half-second that is used up in inflating the suit can run concurrently with the second it takes for the G-force to build up. Thus, the suit can be inflated, ready, by the time the G-force comes on.

The system of adjusting the suit pressure not to the actual G-force on the aircraft, but to the G-force that will be appearing on the aircraft in one second's time, is called the Preview Control system. The system yields marked advantages over the conventional system, because inflation of the suit can be initiated a sufficient time before the G-force comes on for the suit to be inflated to the correct pressure to support that G-force. Improvements in the pilot's tolerance are predicted to be as high as 2- or 3-G extra, especially in cases where the pilot is requiring rapid changes of the G-force.

As mentioned, with the conventional suit-pressure control systems, there was little to be gained by reducing the time taken to actually inflate the suit. By contrast, with Preview Control, any saving in the time it takes to inflate the suit, instead of being just of marginal interest, will now be very useful. When the G-force on an aircraft changes, it does not change according to a smooth linear ramp function, but rather in a more complex fashion: slowly at first as the control surfaces on the wings etc are adjusted; then rapidly; then slowly again as the new G-force is approached. If the suit can be pre-inflated in less than one second, there will be an improvement in the accuracy with which the suit pressure will be able to follow this pattern of change of the G-force.

It is emphasised that there is nothing that can be done, outside of a total re-design of the whole concept of fighter aircraft, about reducing the up to one second it takes from the time the pilot actuates the control stick to the time the G-force comes on. (This period is not stated as a fixed constant: of course, the greater the desired change in G-force, the longer the period will be. The period of up to one second is stated as being typical of the time it takes, from the moment the pilot starts to actuate the control stick, in practice and in a real aircraft, for a substantial change in G-force to become established in the aircraft.)

However, it is recognised that, with development work, there is something that can be done about redesigning the suit and its inflation system, to reduce the time it takes to inflate the suit. But the key step forward of Preview Control is that the suit starts to become inflated, not after the G-force has become established in the aircraft, but a half second or up to one second earlier than that, ie as soon as the pilot actuates the stick.

The present invention is concerned with combining a pressure regulation system into a Preview Control suit inflation system, which will permit the pressure in the suit to be changed, accurately, and with stability, in appreciably less time than the half to one second that such inflation has conventionally taken.

A number of approaches to the pressure regulation requirement will now be discussed.

First, it should be noted that the pressure regulation requirement is a most demanding one. The time it takes to change the G-force, and therefore the maximum time that can be allowed to change the pressure in the suit, if Preview Control is to work at all, is one second. If the suit pressure can be changed faster than that, so much the better: the time saving can be used, not to change the suit pressure too soon ahead of time, but to make the changes in the suit pressure follow the changes in the G-force more accurately.

The nature of the aircraft and its relation to the suit should be borne in mind in this context: consider, for example, if the suit, in order to perform its function, had to change its pressure very quickly (say in one-fiftieth of a second) no pressure regulation system could ever keep up, and high-performance anti-G suits could never be established. If, on the other hand, the aircraft were such that five seconds were available for changing the suit pressure, it would be so easy then for the pressure regulation system to keep up that virtually any type of regulator would serve.

It is recognised, as an aspect of the invention, that the time taken to change the pressure in the suit can be reduced down below half a second, which is very worthwhile, or even less, by the arrangements as described herein. It is recognised that this order of magnitude of a reduction is exactly what is required to convert Preview Control of anti-G suit inflation from a theoretical desideratum into a practical reality.

Again, it is pointed out that the time taken to effect a change in the pressure in the suit is in two components: the time to change the aperture opening in the regulator, plus the time to transfer the air into, or out of, the suit. In Preview Control, a computer on the aircraft is supplied with signals not only from the pilot's actuation of the control stick, but also from sensors which indicate, among other things, the aircraft's present G-force, the cockpit pressure, and such factors as the aircraft's altitude, speed, weight, and many other factors that affect the prediction of the G-force. The computer calculates the ideal pressure in the suit needed for the pilot to tolerate that G-force.

The invention provides a comparator, which makes a comparison between this ideal pressure that will be required in one second's time, and the magnitude of the pressure as it now is, as derived from a pressure sensor in the suit, and calculates the rate at which air must be admitted into the suit (or released from it) in order for the suit pressure to be at that ideal value when that G-force comes on.

The comparator computes how much inflation-air, or rather how great a flow rate of inflation-air, should be admitted into the suit. The pressure regulator therefore must be of the type that is able to receive a signal from the comparator, and to respond to such signal by automatically opening the aperture in the regulator to the appropriate size of opening.

One type of pressure regulator that might be considered for use with Preview Control is the type based on a solenoid-operated on/off valve. With such a regulator, the computer is programmed to energise the solenoid when the valve should be open and de-energise it when the valve should be closed. This simple type of pressure regulator is adequate, however, only when the changes in G-force are well-spaced apart (eg more than two seconds apart). This type of regulator may be termed the solenoid on/off regulator.

Suppose, as an example, that tests have shown that the ideal pressure for a particular G-force in a particular suit should 6 psi. Now, in order to inflate the suit from, say, 3 psi to 6 psi, it is necessary to turn the regulator off at about 5 psi, because otherwise, if left open, the pressure would be still rising when it reached 6 psi, and the pressure in the suit would overshoot. Turning the incoming pressure off at 5 psi so that the pressure just settles to 6 psi is something that can be programmed into the computer. If the change is from 5 psi to 6 psi, equally, the cut-off at 5.8 psi, or as required, again can be programmed into the computer. But these values are empirical, and depend on the computer "knowing" both the start pressure and the final or aimed-for pressure. Therefore, if the aimed-for pressure should be changed before it has been reached, ie by the pilot having again actuated the control stick, then the computer/regulator combination cannot possibly keep up, and the pressure in the suit will be awry, perhaps wildly so. With an on/off-based pressure-controller, the more the pilot requires a change in G-force before an earlier change in G-force has been completed, the more unpredictable the action of the regulator will become. The simple on/off solenoid type of pressure regulator therefore depends on the computer starting from a situation where the G-force and the pressure were in synchronisation, that is to say, the pressure in the suit was at the ideal pressure as required for that G-force. The computer cannot be allowed to start a new computation when the "start" pressure for that computation pressure has not yet reached correspondence with the G-force. Therefore, the simple solenoid type of pressure regulator cannot be used when the pilot requires rapid changes in the G-force.

Another conventional type of pressure regulator includes a spring that acts on a valve member. The pressure in the suit also acts on the valve member, so that, if the pressure in the suit is too low, the spring drives the valve member open, admitting more pressure into the suit. As the suit pressure increases, the valve gradually closes, thereby reducing the flow rate into the suit as the ideal pressure approaches. This type of regulator therefore has a built-in protection against overshoot: that is to say, the valve aperture becomes smaller as the pressure differential becomes smaller.

This type of regulator may be termed a balance-spring-against-pressure type of regulator.

If this type of regulator were selected for use with the anti-G suit, the size of the opening through which pressurised air passes to the suit would not be controlled, or not controlled directly, by the computer. The computer would control the force on the spring, and the size of the opening would be determined by the force on the spring as balanced by the pressure in the suit.

In order to provide that the opening is large when the difference between the spring and the suit pressure is large, the designer would be constrained to give the spring a low stiffness rate; ie the designer provides that the spring moves a substantial distance for each unit of the difference. But if the spring is of a low stiffness rate, the spring is floppy, and the regulator is thus able to hunt and overshoot and be otherwise unstable.

On the other hand, if the designer of a balance-spring-against-pressure type of regulator makes the spring rate too stiff, then the size of the opening will not change much for a given unit of difference, and in that case the regulator will lack the sensitivity required for it to open wide when the difference is large and open only a little when the difference is small.

If he were to use the balance-spring-against-pressure type of regulator, therefore, the designer would be forced to compromise between a high spring stiffness rate that gives too little sensitivity, and a low spring stiffness rate that promotes instability. It is recognised that this compromise cannot be met with a balance-spring-against-pressure type of regulator, when it comes to pressurising a practical anti-G suit in a practical aircraft, when the pilot is calling for the G-force to change for a second time before a first change has been completed. So, in the cases of both the solenoid on/off type of regulator and the balance-spring-against-pressure type of regulator, as just described, the regulators simply cannot be made to keep the suit correctly inflated to the correct pressure, when the pilot is calling for rapid changes in the G-force on the aircraft. It is not a question of increasing the size of the pipes and valves: even with the components of optimum sizing, the compromise between sensitivity and controllability cannot be met.

An aircraft anti-G suit has pockets which have a total capacity, typically, in the five to ten liters range. The suit is pressurised to a maximum of about ten or twelve psi. The material of the pockets is resilient to a certain degree, so that the volume of the suit increases as it is pressurised. With these parameters, changing the pressure from 3 psi to 6 psi in half a second, accurately, and with stability, is a most demanding task. The task is made doubly difficult if the required or aimed-for pressure should be changed before the initial aimed-for pressure has been reached. It is recognised that conventional pressure-regulation systems are not equal to the task.

It is recognised that Preview Control of the pressure of an anti-G suit however can be made to work, provided the suit pressure is controlled by the pressure regulation system as described herein. The benefits of Preview Control, provided the pressure can be properly regulated, can be expected, it is aimed, to be that the maximum G-force the pilot can withstand can be as high as 10-G. Even more important than the maximum G-force is the fact that the pilot can withstand rapid changes in G-force, and can withstand rapid rates of change of the G-force.

In the invention, the pressure regulator has a fluid-flow aperture connecting a pressure source with the suit, in which the aperture is of variable size. The regulator is such that the valve member of the regulator can be held at the partially open position.

In the invention, the size of the aperture is changed very rapidly, and yet with stability. One preferred manner in which the rapidity-stability requirement might, in the context of the invention, be numerically defined, is proposed as follows.

In the preferred definition, the time taken to effect a stable change in the size of the aperture is the time taken from the moment of initiation of the size change until the moment the change is stabilised to the new opening size, and is stabilised thereto with a deviation error from the required new size of less than one tenth of the magnitude of the change.

In the invention, it is preferred that the time taken to effect such a stable change is so rapid that the time interval between these two moments is less than about 100 milliseconds.

It is recognised that one of the keys to making Preview Control work is to provide a controlled force to change the size of the aperture opening in the pressure regulator very quickly. There are limits to what can be done to reduce the actual air flow rates into and out of the suit pockets, since the pockets are a little elastic, and there is a limit to how fast air can move through passages and pipes, whereby the inflation time of the suit, from opening the aperture to the suit being inflated (and the aperture reduced to zero) is quite long: of the order of 300 or 500 milliseconds. The invention lies in getting the aperture valve-member to change its size in a controlled and stable manner in a much shorter time interval than that.

The invention lies in recognising that a progressively-opening valve member (ie the member that opens/closes the regulator aperture), and a powered or active servo-system to power the valve member between openings, will provide the required degree of rapid yet stable response. A passive system for opening the valve-member, where the opening force comes from the pressure itself (as in the conventional spring/piston regulators) cannot have the quick, stable response required. A designer can vary the size of the opening by providing a bank of on/off valves, and switching in more or less of the valves. But on/off valves cannot be cycled on/off rapidly, ie slamming rapidly from fully open to fully closed, and expect to have a long service life.

It is recognised that the valve member can be made to move to the new opening size of the aperture rapidly if the valve member opens the aperture progressively, and if a powered servo-system is provided, which powers the valve member to the new opening size.

The invention reduces the time it takes for the pressure regulator to effect a rapid but stable change in the size of the aperture. As a result, it now becomes very worthwhile also to reduce the time taken for the air to flow into and out of the suit. Once the invention is in place, careful attention to pipe sizes, etc, can be expected to pay off in sharper control of the suit pressure.

The reduction in the time taken to effect a stable change in the aperture size means that the changes in suit pressure can be accomplished in markedly less time than it takes for the G-force actually to come on to the aircraft. Advantage can be taken of this reduction in time to make the suit pressure conform not just to the changes in G-force, but to different rates of change of the G-force. It may be that the ideal suit is one that exactly follows the changes in G-force as they come on to the aircraft, or it may be that having the suit-pressure slightly anticipating the upcoming G-force gives better pilot performance results. The point is, the invention permits either to be tried: the prior art pressure regulators were so unresponsive that it was hardly possible even to experiment with such determinations.

Exemplary embodiments of the invention will now be described with reference to the accompanying drawings, in which:

DETAILED DESCRIPTION OF THE DRAWINGS

The structures shown in the accompanying drawings and described below are examples which embody the invention. It should be noted that the scope of the invention is defined by the accompanying claims, and not necessarily by specific features of exemplary embodiments.

Figure 1:
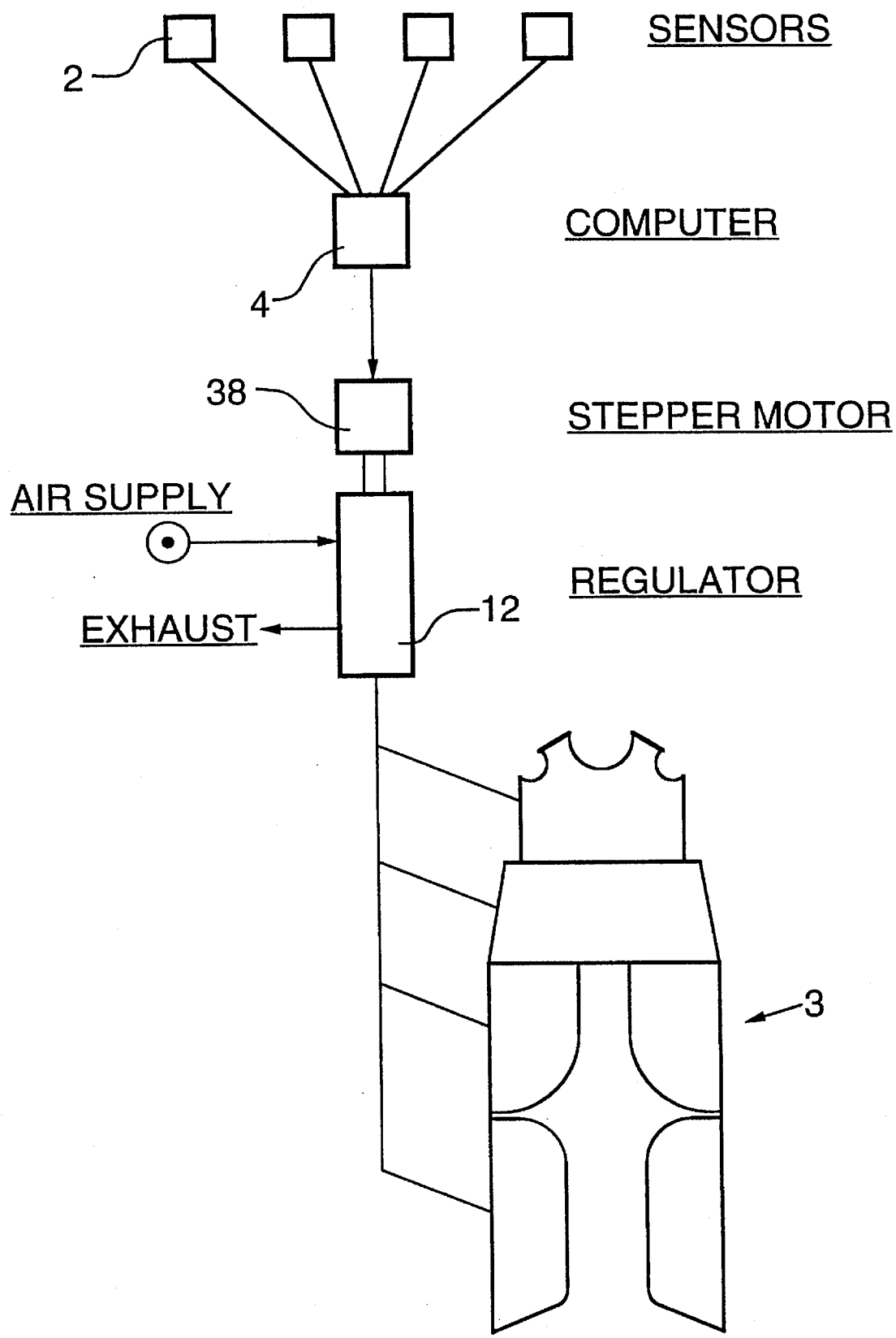
FIG. 1 is a block diagram of a pressure regulator system that embodies the invention, as used to regulate the pressure supplied to an aircraft pilot's anti-G suit.

FIG. 1 shows a series of sensors 2, which are set up to detect the various parameters on which the pressure in the receptacle 3 should depend. A computer 4 receives the signals from these sensors, and, using formulas, algorithms, empirical relationships, and the like, as previously programmed, makes a computation as to what pressure, under the circumstances, the receptacle 3 should be at. The computer then issues an appropriate voltage or other form of output signal to an actuator of a pressure regulator 12, which adjusts the pressure regulator to supply the desired pressure to the receptacle 3.

In the case of an aircraft anti-G suit, the sensors 2 may be set up to detect present G-force on the aircraft, present suit pressure, altitude and speed of the aircraft, position of control stick (which determines what the G-force will be in, say, half a second, or one second), and so on.

The computer 4 responds to the values of the parameters, and computes a figure for the desired pressure. This computation is done by the computer more or less immediately. If the parameters are varying rapidly, the computer changes the output signal for the desired pressure, which is again done more or less immediately.

No matter how fast the speed of response of the computer, for the receptacle 3 to be correctly pressurised at all times requires that air must be fed into and out of the suit with great response, rapidity, and accuracy.

Figure 2:
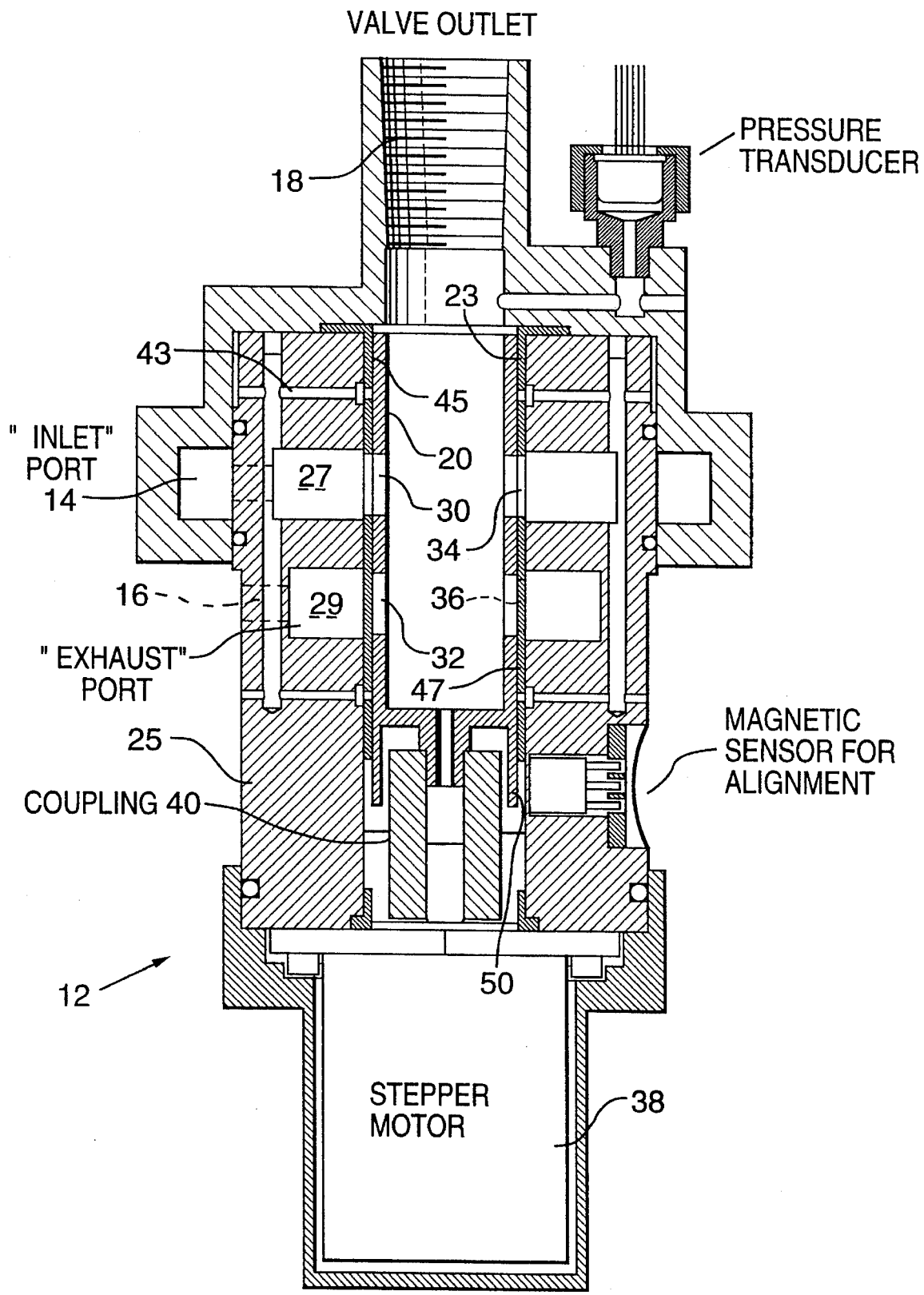
FIG. 2 is a cross-section of a pressure regulator, which is included in the system of FIG. 1.
Figure 3:
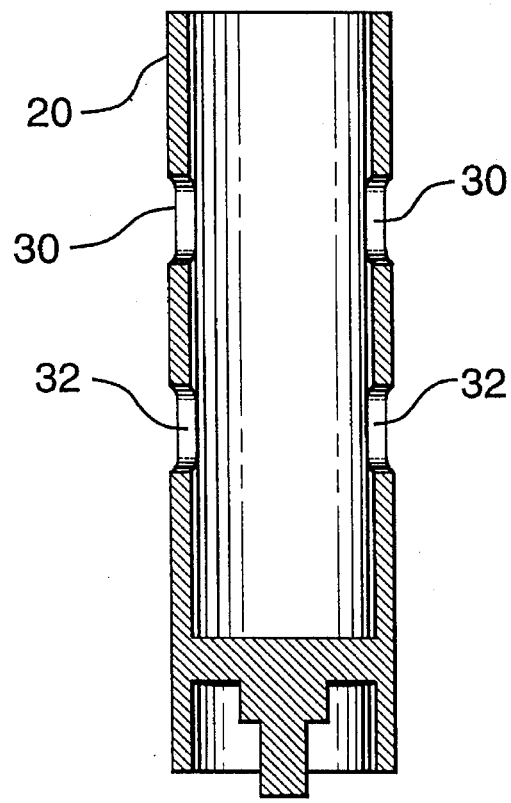
FIG. 3 is a view of a rotor that is a component of the regulator of FIG. 2.

FIG. 2 is an assembly drawing of the pressure regulator 12. The regulator is provided with a pressurised air supply, at inlet port 14, and an exhaust at exhaust port 16. Air at the regulated pressure is present in the pressure tube 18, which is connected to the pilot's anti-G suit. It is the task of the regulator 12, when the suit pressure is too low, to admit air from inlet port 14 into the pressure tube 18, and when the suit pressure is too high, to transfer air out of the pressure tube 18, and exhaust the air from exhaust port 16.

The regulator 12 includes a rotor 20. The rotor 20 is housed inside a hollow sleeve 23. The sleeve 23 is clamped or otherwise fixed into the housing 25 of the regulator against rotary or other movement.

The housing 25 is formed with annular grooves, which are disposed radially outwards from inside the interior of the housing. The grooves are an inlet groove 27 and an exhaust groove 29. The inlet and exhaust ports 14,16 communicate with these grooves.

The rotor 20 is provided with inlet windows 30 and exhaust windows 32, which correspond to the inlet windows 34 and exhaust windows 36 in the sleeve 23. When the rotor is turned clockwise from a centralised equilibrium position, the inlet windows 30 in the rotor start to lie over the inlet windows 34 in the sleeve. The number of degrees of angular movement of the rotor 20 is a measure of the size of the aperture thus created. The exhaust windows 32 in the rotor do not move over the exhaust windows 36 in the sleeve when the rotor rotates clockwise.

Similarly, when the rotor rotates anti-clockwise, the exhaust windows 32,36 overlap and the inlet windows 30,34 remain closed.

The magnitude of the aperture or orifice created by the windows sliding over each other determines the rate and velocity of flow of pressurised air from the inlet into the pressure tube, or from the pressure tube to exhaust.

Once pressure in the pressure tube has reached the desired value, the rotor resumes its centralised or null-position, where both the inlet and exhaust windows are closed.

The rotation of the rotor 20 is effected and controlled by means of a stepper motor 38, the armature of which is coupled to the rotor 20 via a coupling 40. The coupling 40 is effective to transmit only torque between the armature and the rotor, thereby relieving the rotor of the effects of any slight misalignment with the armature.

It may be noted that nothing in the mechanical structure of the regulator 12 is set by, or depends on, the pressure in the pressure tube 18. In particular, it may be noted that the windows lie over each other in an open or closed position entirely in dependence upon the electrical setting of the stepper motor, and not at all in dependence upon the pneumatic pressure in the pressure tube. In conventional pressure regulators, often an aperture-closure-member is acted upon by the pressure in the pressure tube, whereby as the pressure rises, the pressure urges the closure member to reduce the aperture. This is not the case in the present design, where any pressure in the pressure tube, or in any other part of the regulator, has no effect on the orientation of the rotor.

It is important, from the standpoint of speed of response, accuracy, and reliability of the regulator that there be as little friction as possible between the rotor 20 and the sleeve 23. Preferably, the rotor is made of stainless steel, and the sleeve from a bearing-material compatible therewith.

It is important that the fit of the relatively moving parts on each other should not change even if temperature and other ambient conditions should change (as they do, in aircraft). The designer preferably would avoid the use of plastic materials for the sleeve or rotor, therefore, since plastic materials are often not so dimensionally stable under extreme variations in the environment.

The rotor and sleeve are in a journal-bearing relationship, and because of the design of the regulator there is very little side or radial loading between the rotor and the sleeve, and it is recognised that air bearings, comprising a trickle of air supplied at the inlet pressure, will suffice to hold the rotor and sleeve apart. Accordingly, passages 43 are provided in the housing 25, which conduct air from the inlet port to air-bearings 45,47.

The air bearings 45,47 are hydrostatic, in that they are supplied with pressurised air throughout operation of the regulator, and so long as the regulator is supplied with pressurised air.

Air bearings leak air, and the leakage may track its way to the exhaust port, and also into the pressure tube. However, this can usually be ignored; if the leakage causes an increase in the pressure in the anti-G suit, the sensors and the computer will detect that, and will open the exhaust window to maintain the desired suit pressure.

The magnitude of leakage of air from the air bearings 45,47 is not large, since the air bearings comprise such a very small clearance between the rotor and the sleeve. However, the designer might wish to see to it that such leakage is minimised. In that case, seals may be incorporated into the design.

Figure 7:
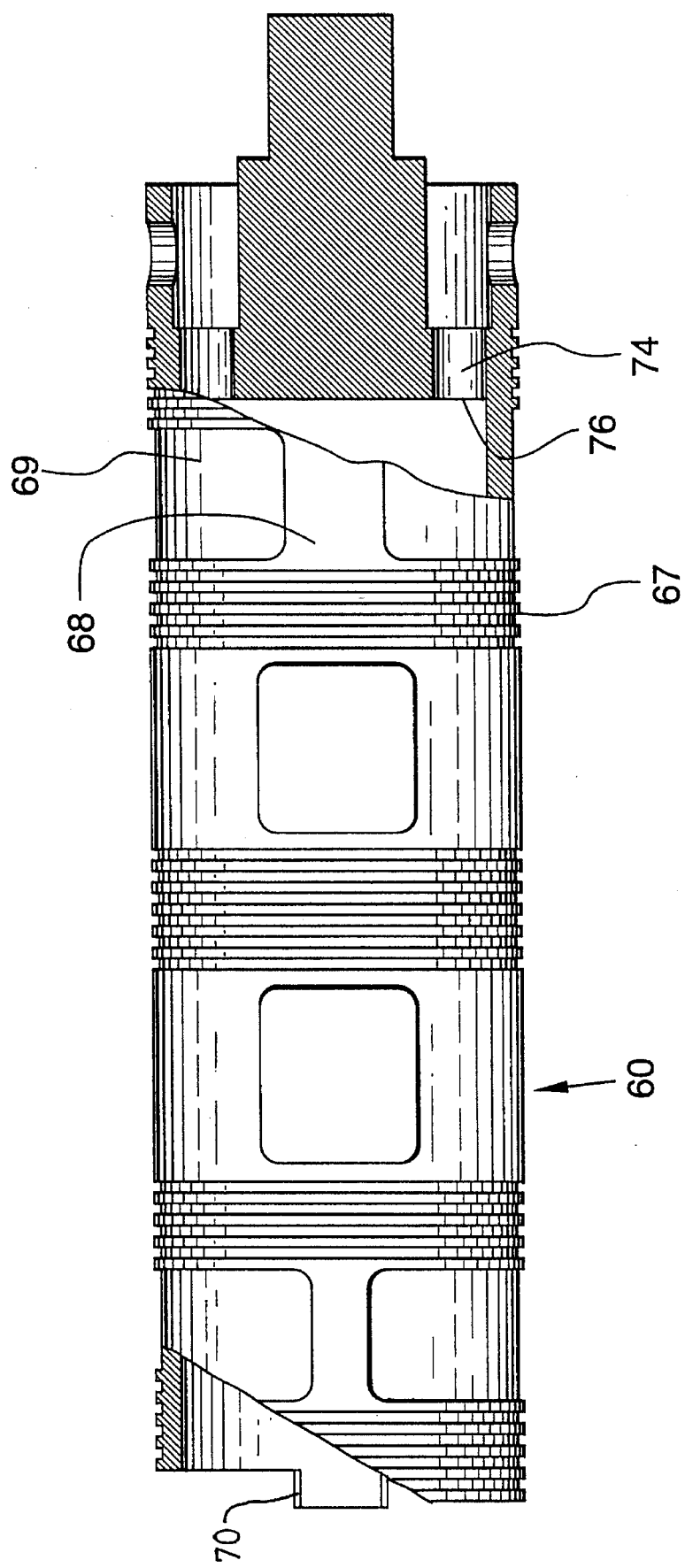
FIG. 7 is a view of a rotor that is a component of the regulator of FIG. 6.

It is preferable to avoid elastomeric seals between the rotor and the sleeve, because elastomeric seals add rubbing friction and introduce hysteresis, and are liable to fail. A labyrinth seal is preferred for minimising leakage of air from the air bearings. A labyrinth seal may be provided by forming many small grooves in the outer surface of the rotor, as shown at 67 (FIG. 7).

The amount of leakage through air bearings increases with pressure. Therefore, it may be found that even at the null-position of the rotor, in which the pressure in the suit is being maintained constant, a small compensatory movement of air into or out of the suit will be required. The system will automatically signal the need for such small equilibrium-maintaining air-flows. The magnitude of the air-flow needed will vary with the pressure.

The stepper motor 38 may be subject to slippage and other errors, whereby the angular position of the armature of the motor for any given input signal may vary over time. A magnet 50 is attached to the rotor, to assist in periodic re-alignment and re-orientation of the rotor.

With the window arrangement as shown, the rotor would step through about 90 degrees clockwise to fully uncover the exhaust window, and the same anti-clockwise to uncover the inlet window. An appropriate number of steps would be around ten steps for the 90 degrees, ie the stepper motor 38 should be the kind which has at least forty steps or more per revolution. Proprietary stepper motors generally have far more available steps per revolution than forty. That is to say: there is no difficulty in selecting a stepper motor which has the required sensitivity to operate as described, The rotor 20 is constrained in the housing against any other mode of movement except rotation about the cylindrical axis of the rotor. As such, the rotor is not affected by the G-force experienced by the aircraft. A linearly-moving, or sliding, component in the regulator, by contrast, would be affected by such G-forces, which would affect the accuracy and controllability of the regulation. Also, the angular momentum of a rotor about its cylindrical axis is much less than the linear momentum of a slider of corresponding size.

The inlet windows and the exhaust windows are each divided into two half portions, which are situated in diametric balance on opposite sides of the rotor. Therefore, when air flows into or out of the windows, the momentum of the flow does not give rise to a reaction to one side or the other. If the flow were to take place only through a single window, the resulting reaction force would be transmitted to the air bearings. Air bearings perform best (at least at low rotational speeds) when subjected to only nominal radial or side loads.

It may be noted that the momentum of the flow does not tend to carry the windows with it: that is to say, the windows are neither pushed open nor pushed closed by the flow of air, no matter how vigorous that flow. In the design as described, the opening of the windows is virtually completely neutral as regards susceptibility to the effects of any forces other than the forces transmitted to the rotor from the stepper motor. Therefore, the stepper motor is not required to deliver much by way of overcoming spurious forces and resistances, and can be set for light, yet positive, fast, response.

In order to provide a good circumferential length of window, the inlet windows and the exhaust windows may be at two different axial locations as shown. If all the windows were at the same axial location, especially since the windows are divided into half-portions, each window would have to be circumferentially quite short. The two half portions of the one window can be spaced or staggered axially, which allows for even more circumferential length to the windows, if desired. The designer will incur little penalty by extending the axial length of the rotor so as to accommodate axially-staggered windows.

It will be noted that the windows in the rotor extend through the walls of the rotor, which are thin. Therefore, the length of the flow-restricting pathway is short. When the window is just open (ie almost closed) for example, the short restricted flow aperture is backed by wide open zones. This again makes for fast, positive, controllable, response. If the window were long, ie long in the direction of flow of air through the window, then especially when the window was almost closed, it would take a non-negligible lag time for the small flow of air to become established into or out of the interior chamber of the rotor. In the described design, the rotor walls are enabled to be thin because the outlet to the receptacle comprise the hollow interior of the rotor, and therefore the windows communicate directly with the output passage. The fact that the rotor is a thin-walled tube is therefore a preferred feature of the invention.

The low-inertia, balanced, rotor as described, can snap to a new angular position quickly, and can stop accurately at the new position. Such a rotor has little angular momentum, and is not significantly vulnerable to overshoot or other instabilities. By feeding the output to the receptacle directly from the hollow interior of the rotor, and placing the windows in the cylindrical wall of the rotor, both the increase and decrease of the pressure in the receptacle can be handled with the same positive, controlled, accuracy. This is important in a fighter aircraft, where, during combat, the rotor can be expected to be in constant motion, accelerating, stopping, reversing, and stopping again.

Figure 5:
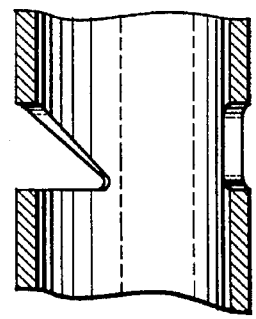
FIG. 5 is a developed view of a modified form of overlapping windows.
Figure 4:
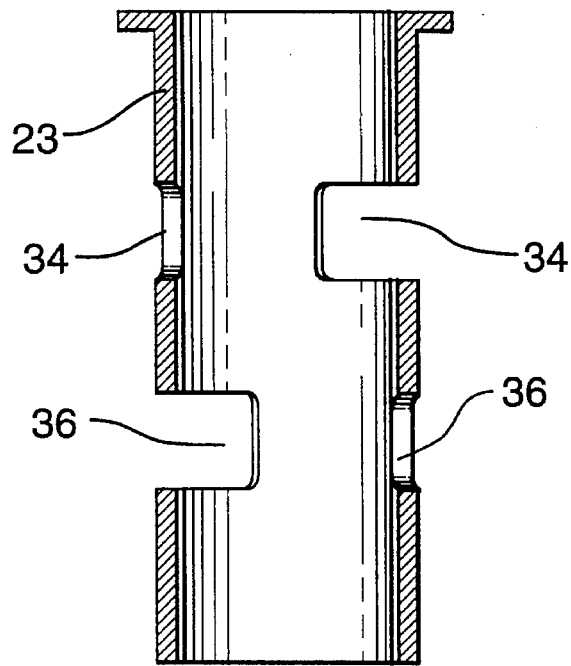
FIG. 4 is a view of a sleeve in which rotation of the rotor of FIG. 3 takes place.

It may be arranged that the windows overlap and uncover each other in a more advantageous manner than if the windows are basically rectangular as in FIG. 2. FIG. 5 shows triangular overlap of the windows, which provides a more linear relationship between air-flow-through rate and the angle of orientation of the rotor.

Figure 6:
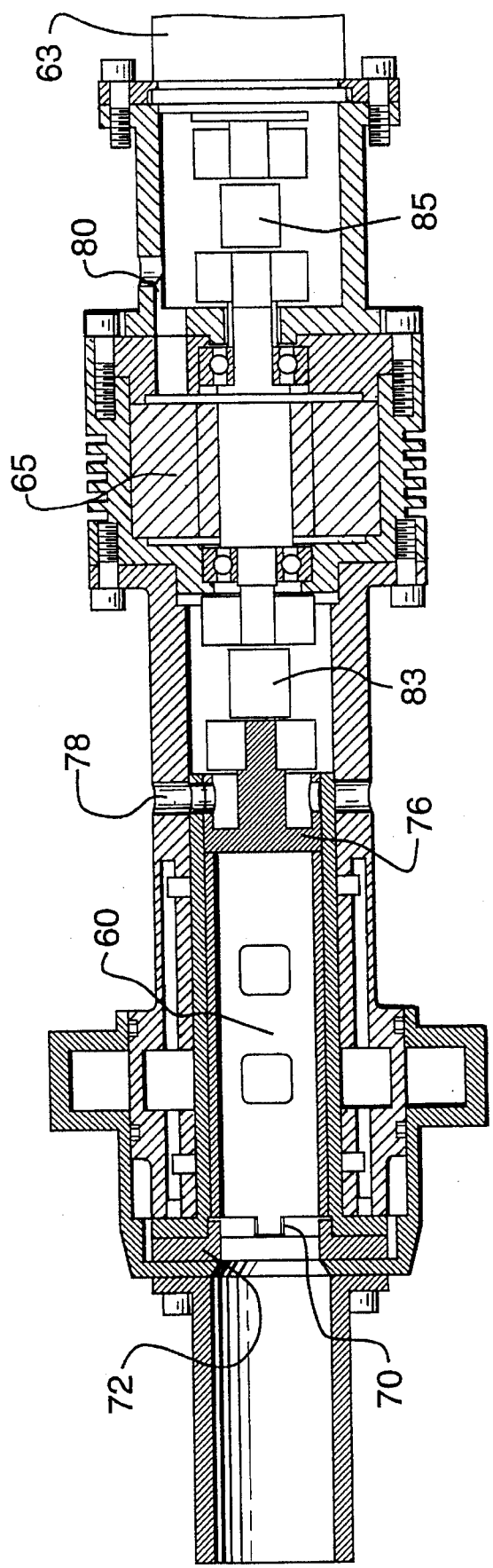
FIG. 6 is a cross-section of another pressure regulator.

FIG. 6 shows a regulator of somewhat different design. Here the rotational orientation of the rotor 60 is set by a (conventional) rotary-variable-displacement-transducer (RVDT) 63, rather than by the magnet and sensor as in FIG. 2. Rotation of the rotor is controlled by a servo motor 65. The servo motor 65 and the RVDT 63 together serve to move the rotor 60 rapidly, but with great stability, to new orientations as required according to signals fed into the RVDT and motor. As the requirement for re-orientation of the rotor arises, the RVDT measures the error between the actual orientation of the rotor and the desired orientation, and provides a signal corresponding to the error; this signal is used in the usual negative-feedback loop to drive the error to zero.

FIG. 7 shows the rotor 60 in more detail. The grooves 67 for the labyrinth seals for the air bearings may be observed, along with pillows 68 and pockets 69, which serve to enhance the performance of the air bearings.

The rotor is formed with a nose 70, which interacts with a limiter 72 to limit the angular movement of the rotor.

The rotor 60 is provided with through-holes 74, which serve to equalise pressure either side of the main structural wall 76 of the rotor. Thus, there is no net pressure acting to load the rotor in the axial sense; if such axial loading were present, thrust bearings would be needed to react the axial force.

The hole 78 (FIG. 6) serves to receive a peg, by means of which the rotor 60 can be accurately aligned rotationally with the body of the regulator, when setting up, and when checking the alignment of, the rotor. The hole 78 is plugged during normal operation. Similarly, the hole 80, through which electrical leads to the servo-motor 65 are passed, is sealed during normal operation.

A coupling 83 ensures that no spurious misalignments can be transmitted between the servo motor 65 and the rotor 60. Similarly, a coupling 85 isolates the RVDT 63 from the servo-motor.

It will be understood that in the systems as just described, the item that is under control is the size of the aperture in the pressure regulator. The computer issues a signal stating how wide open the aperture is to be at a particular instant. The computer carries out the calculation based on empirical formulas; for example, that xx psi pressure differential requires zz sq cm of aperture opening, as an empirical relationship. As the air flows in, to equalise the pressure, the formula indicates that a smaller opening of the aperture is now required. (The empirical relationship is not necessarily mathematically simple: for example, it might be appropriate in some cases for the aperture opening to depend, at least in part, on the rate of change of the pressure differential.)

It is not essential that the aperture opening be updated in a smooth, step-less manner. For example, it may be appropriate for the required pressure differential to be determined periodically; in that case, the aperture is kept at the last opening-setting until the next update. In fact, in that case, the aperture, instead of remaining static during the period between updates, may be set to change, between updates, according to some pre-determined formula which anticipates what the next opening of the aperture, following the next update, may be expected to be.

One further consideration in the case of high performance fighter aircraft is the pilot's breathing. It has been found that pilot performance is improved in high G-force manoeuvres if he is supplied with positively-pressurised air for breathing. For safety's sake, however, it is preferred, if the pressure of the breathing air is to be increased substantially, that the pilot be provided with a constraining jerkin around his chest to prevent inadvertent over-inflation.

It will be appreciated that such a jerkin should not take the form of a tight band constricting the pilot's breathing at all times, but should take the form of a band of variable tightness, which is applied only when, and to the degree, necessary.

In fact, it is recognised that the Preview Control system as described, can be used not only to inflate the pilot's anti-G suit, to prevent blood pooling in the lower extremities, but can be used also to control the inflation of the pilot's chest jerkin, Whereby positive pressure breathing can be safely and comfortably resorted to. The control requirements are very similar, although naturally the empirical relationships are different.

Figure 8:
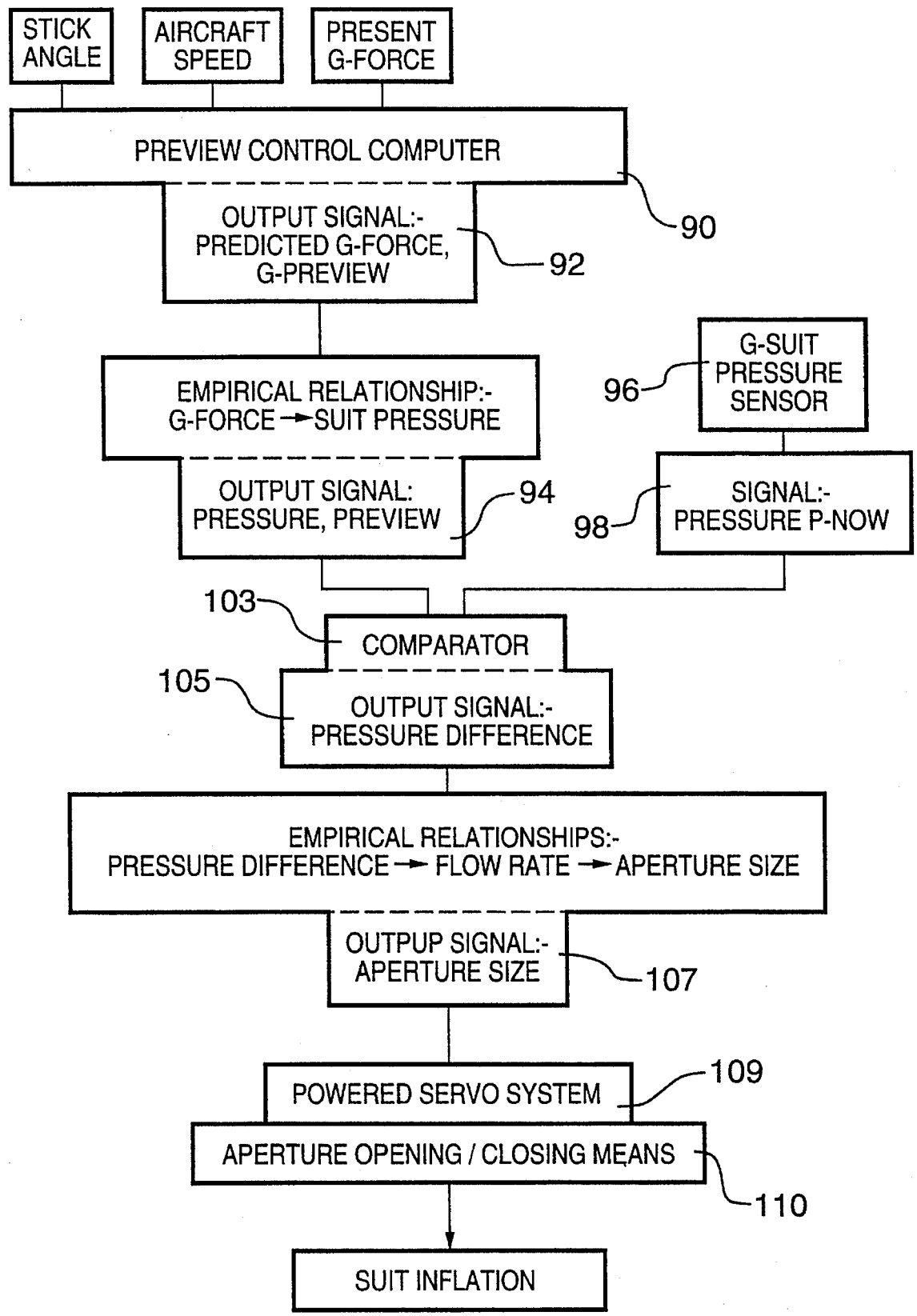
FIG. 8 is a block diagram of the control system of the anti-G suit.

FIG. 8 is a block diagram showing a generalised version of the whole anti-G suit control system, in which the pilot's movement of the control stick is converted into a corresponding pressure in the anti-G suit (and in the chest-jerkin).

The stick movement and the rest of the aircraft parameters are fed into the preview control computer 90, Which uses the data to compute what the G-force on the aircraft will be half a second or a second ahead (this period depending on, among other things, the type of aircraft, etc). The preview control computer issues an output signal 92 corresponding to that predicted G-force.

The preview control process may be carried on continuously, whereby the output signal 92 is being continuously and step-lessly updated, or may be carried out in discrete steps, at intervals of, say, 100 milliseconds, whereby the signal 92 is step-updated at those intervals.

A calculation is next carried out, to determine what the suit pressure should be to best protect the pilot from that G-force. This relationship between suit-pressure and G-force is determined beforehand, empirically, in tests on pilots under controlled G-level conditions. As a result, the predicted G-force signal 92 becomes a pressure signal, P-preview 94.

Meanwhile, pressure sensor 96 in the suit is providing a signal corresponding to the present suit pressure, P-now 98.

Comparator 103 produces a signal corresponding to the difference 105 between P-preview and P-now. In other words, the comparator 103 determines how much inflation (or deflation) of the suit has to be done.

Another calculation is now carried out, to determine what the size 107 of the aperture opening in the pressure regulator should be in order to change the pressure in the suit by that amount. This relationship between pressure difference and aperture size again is empirical, being determined beforehand in tests under controlled conditions. The aperture should be opened as widely as possible, bearing in mind the need to keep the pressure from overshooting the desired value.

The signal 107 corresponding to aperture size is then fed to the powered servo system 109, which actually turns the aperture opening/closing means 110 (ie the rotor in the regulator), thereby adjusting the aperture size.

As the suit becomes inflated the pressure sensor in the suit changes its signal 98, which sets up a change in the size of the aperture 107 in the regulator. When the suit is fully inflated, the aperture closes.

Before that happens, the pilot may have changed the control stick, initiating a change in P-preview. This might require the aperture size to inflate (or deflate) the suit to the new pressure.

In some cases, the pressure sensor 96 in the suit may not be responsive enough. In that case, more sensors may be included in the suit, positioned at strategic locations. Not just the sensor readings, but the relationships between sensors can then be used to determine patterns off airflow, which can be used to give a more accurate indication of what the size of the regulator aperture should be.

With the pressure regulation system as described, it now becomes worthwhile to increase the responsiveness of such things as the suit pressure sensors, since, with the elimination of other sources so error, such things are now contributing significantly to whatever delays and time lags still remain in the system.

The preview control system, and associated facilities, as described, produce a signal corresponding to the desired aperture opening size, more or less immediately the pilot moves the stick. It is a main feature of the invention that the regulator aperture is actually manipulated to that desired size also more or less immediately. Thus, it may be regarded that as the pilot moves the stick, the rotor in the pressure regulator instantly moves to the required new opening that will inflate the suit to the new pressure. In other words, there is a virtual instantaneous, ie lag-free, correspondence between the pilot's movement of the stick and the opening and closing of the aperture in the regulator. Now, the only lag in the system is the suit itself. When the indicated pressure difference 105 is at a maximum, and hence the aperture 107 is wide open, a typical G-suit pressure regulator will produce a flow rate into the suit corresponding to a reduction in the pressure difference of about 20 psi per second. As the desired pressure is approached, and the aperture starts to close, the rate of increase of suit pressure becomes much slower.

It can be helpful in some cases not to keep preview control operational all the time. At times when the pilot knows there is no prospect of high-G manoeuvres, he may switch off preview control, thereby preventing the build-up of whatever cumulative errors there may be in the system. In fact, it is beneficial if the pilot can carry out controlled G-force manoeuvres, using the G-force sensors on the aircraft, whereby he can "train" the preview control system to reproduce accurately the best relationship between G-force and suit pressure.

We claim:

1. The combination of an anti-G suit, a pressure regulator, a computer, and a comparator, wherein:

the anti-G suit comprises a suit which is suitable for wear by a pilot of a high-performance aircraft;

the suit includes at least one inflatable pocket, and with a means for directing an inflation fluid into and out of the pocket;

the computer is programmed to compute a prediction, in accordance with certain parameters including a position of a control stick of the aircraft, as to what a G-force on the aircraft, G-preview, will be at a pre-determined time in the future;

the computer is programmed to compute a future pressure, P-preview, of the inflation fluid, being the pressure to which the pocket should be inflated when the aircraft is experiencing the said predicted future G-force, G-preview;

the combination includes a means for determining the present inflation pressure, P-now, in the pocket;

the comparator is connected to the computer and the means for determining, and is capable of making a comparison between P-now and P-preview, and capable of outputting an electrical signal corresponding to the said comparison;

the pressure-regulator includes a fluid-flow-aperture, which communicates the pocket with a fluid pressure source, and includes a valve-member which is orientatable in a direction to open and close and to vary the size of the fluid-flow-aperture;

the combination includes a valve-member-moving-and-holding-means, which is capable of orientating the valve-member between closed and fully-open orientations of the valve member, corresponding to closed and fully-open sizes of the aperture, and is capable of orientating the valve-member to a partially-open orientation of the valve-member wherein the size of the aperture is intermediate between closed and fully-open, and the valve-member-moving-and-holding-means is capable of holding secure the valve-member in that partially-open orientation;

the valve-member-moving-and-holding-means is under the control of the comparator, in that the valve-member-moving-and-holding-means includes a means responsive to the aforesaid electrical signal from the comparator, and in that the valve-member-moving-and-holding-means, in response to, and as determined by, the aforesaid signal, is capable of orientating the valve-member to the aforesaid partially-open orientation of the valve-member in accordance with that signal, and to hold the valve-member secure in that partially-open orientation.

2. Combination of claim 1, wherein the valve-member-moving-and-holding-means is capable of changing the orientation of the valve-member, from a first orientation to a new orientation, being any other orientation between closed and fully open;

and wherein the valve-member-moving-and-holding-means is capable of ensuring that a time interval, defined as starting at a moment of initiation of a change in orientation of the valve-member until a moment the valve-member is stabilised to the new orientation with a deviation error from the new orientation of less than 1/10 of the change, is less than 100 milliseconds.

3. Combination of claim 1, wherein the pressure-regulator is of the type in which pressure of the inflation fluid already in the pocket exerts only a minimal or negligible force on the valve-member in the direction to open or close the aperture, but the valve-member-moving-and-holding-means exerts a maximal holding force on the valve-member, to the extent that the valve-member-moving-and-holding-means holds the valve-member secure in the partially-open orientation, as determined by the signal from the comparator, substantially independently of the magnitude of the pressure of the inflation fluid already in the pocket.

4. Combination of claim 1, wherein the comparator is capable of outputting the signal, being the signal corresponding to the comparison between P-now and P-preview, in a form whereby a particular level of the signal, as received by the valve-member-moving-and-holding-means, corresponds to a particular orientation of the valve-member.

5. Combination of claim 4, wherein the valve-member-moving-and-holding-means, is effective, in response to the aforesaid signal, to orientate the valve-member over a range of orientations of the valve-member;

whereby the size of the aperture is variable, and whereby the size of the aperture is a function of the signal.

6. Combination of claim 5, wherein:

the pressure regulator has an input port and an exhaust port, and a pressure pipe connection to the pocket;

the regulator includes a housing, which includes inlet and exhaust windows in communication with the inlet and exhaust ports;

the valve-member comprises a rotor of the regulator, which is mounted for rotation in the housing;

the rotor includes windows, which are arranged to cover and uncover the input and exhaust windows in the housing proportionately in accordance with the angular orientation of the rotor in the housing;

the valve-member-moving-and-holding-means comprises an electric motor means which, in response to the signal from the comparator, is capable of rotating the rotor to a particular angular orientation relative to the housing in accordance with the level of the aforesaid signal.

7. Combination of claim 6, wherein the motor means is effective to hold the rotor at the aforesaid angular orientation for as long as the level of the output signal continues to indicate a continuation in direction and magnitude of a difference between P-preview and P-now.

8. Combination of claim 6, wherein:

the rotor is of generally hollow-cylindrical form, having an annular wall with external and internal surfaces;

the internal surface of the rotor defines a hollow interior chamber of the rotor;

the pressure pipe connection to the pocket opens directly into the interior chamber of the rotor, to the extent that the pressure in the pressure pipe connection is substantially the same as the pressure in the interior of the rotor, irrespective of the angular orientation of the rotor;

the housing is formed with an internal cylindrical surface, in which the rotor is received for rotation;

the internal cylindrical surface of the housing includes openings that define the inlet window and the exhaust window in the housing;

the annular wall of the rotor includes the inlet window and the exhaust window in the rotor;

the inlet and exhaust windows in the rotor comprise holes through the annular wall, into the interior chamber of the rotor;

the inlet and exhaust windows in the rotor are arranged in rotary overlapping relationship respectively with the inlet and exhaust windows in the housing, to the extent that, when the rotor rotates to a new angular orientation, the degree of rotary overlap between the windows is changed.

9. Combination of claim 8, wherein the inlet windows in the rotor and the housing are spaced apart from the exhaust windows in the rotor and the housing, at a different axial location along a cylindrical axis of the rotor.

10. Combination of claim 8, wherein the inlet and exhaust windows in the rotor and the housing are all divided each into two respective half-portions, which are spaced diametrically apart on opposite sides of the respective cylindrical surfaces.

11. Combination of claim 8, wherein:

the structural arrangement of the windows is such that in a null-orientation of the rotor the exhaust window in the rotor lies offset to one side of the exhaust window in the housing, whereby the interior chamber of the rotor is isolated from the exhaust port;

the structural arrangment of the windows is such that when the rotor rotates progressively clockwise from the null position the exhaust window in the rotor moves to uncover the exhaust window in the housing, whereby the interior chamber of the rotor then is progressively opened to the exhaust port;

and the structural arrangement of the windows is such that in the null-orientation of the rotor the inlet window of the rotor lies offset to one side of the inlet window of the housing, whereby the interior chamber of the rotor is isolated from the inlet port, and is such that when the rotor rotates progressively anti-clockwise from the null position the inlet window in the rotor moves to uncover the inlet window of the housing whereby the interior chamber of the rotor then is progressively opened to the inlet port.

12. Combination of claim 4, wherein the valve-member-moving-and-holding-means is such that the size of the aperture is variable smoothly and steplessly, in that the valve member is orientatable smoothly and steplessly between the fully-open and closed orientations of the valve member.

13. Combination of claim 12, wherein:

the valve-member-moving-and-holding-means comprises a servo-system, which includes a power source, and includes a motor means powered by the power source;

and the servo-system is capable, in response to the signals from the comparator, of orientating the valve member.

14. Combination of claim 13, wherein:

the servo-system is of the kind which, by negative feedback, tends to reduce an error to zero;

the servo-system is so arranged as to receive the signal from the comparator corresponding to the required orientation of the valve-member;

the servo-system includes means for determining the actual orientation of the valve-member;

whereby the servo system is effective to drive to zero the error between the required orientation of the valve-member and the actual orientation of the valve-member.

15. Combination of claim 4, wherein the valve-member-moving-and-holding-means is such that the size of the aperture is variable in steps, in that the valve-member is orientatable through a series of discrete steps between the fully-open and closed orientations of the valve member.

16. Combination of claim 15, wherein the valve-member-moving-and-holding-means is a stepper motor.

17. Combination of claim 16, wherein the stepper motor is of the electrically-powered rotary type, in which an armature of the stepper motor is movable in steps to different angular orientations of the armature in response to electrical signals received into the stepper motor.

18. Combination of claim 1, wherein the aforesaid predetermined time is the time it takes, on that aircraft, from when the pilot actuates the control stick to initiate a change in the G-force on the aircraft, to when that G-force has become established on the aircraft.

19. Combination of claim 18, wherein the aforesaid predetermined time is about one second.

20. Combination of claim 1, wherein the computer is programmed to compute the aforesaid prediction of G-preview, and to compute the pressure P-preview, and to output the electrical signal corresponding thereto, at a frequency of 10 Hz or more.

* * * * *